(12) United States Patent
Liao et al.

(10) Patent No.: US 12,097,659 B2
(45) Date of Patent: Sep. 24, 2024

(54) EXCHANGEABLE ADDITIVE MANUFACTURING MACHINE SYSTEM WITH AIR CURTAIN ISOLATION MECHANISM

(71) Applicant: National Central University, Taoyuan (TW)

(72) Inventors: Chao-Yaug Liao, Taoyuan (TW); Bo-Ren Chen, Taoyuan (TW)

(73) Assignee: National Central University, Taoyuan (TW)

( * ) Notice: Subject to any disclaimer, the term of this patent is extended or adjusted under 35 U.S.C. 154(b) by 217 days.

(21) Appl. No.: 17/969,284

(22) Filed: Oct. 19, 2022

(65) Prior Publication Data
US 2023/0415419 A1 Dec. 28, 2023

(30) Foreign Application Priority Data

Jun. 23, 2022 (TW) .................................. 111123517

(51) Int. Cl.
| | | |
|---|---|---|
| *B29C 64/20* | (2017.01) | |
| *B29C 64/259* | (2017.01) | |
| *B29C 64/295* | (2017.01) | |
| *B29C 64/364* | (2017.01) | |
| *B33Y 30/00* | (2015.01) | |
| *B33Y 40/00* | (2020.01) | |

(52) U.S. Cl.
CPC .......... *B29C 64/364* (2017.08); *B29C 64/295* (2017.08); *B33Y 30/00* (2014.12); *B33Y 40/00* (2014.12)

(58) Field of Classification Search
CPC ... B29C 64/364; B29C 64/295; B29C 64/259; B33Y 10/00; B33Y 30/00; B33Y 40/00
See application file for complete search history.

(56) References Cited

U.S. PATENT DOCUMENTS

| | | | |
|---|---|---|---|
| 2018/0200790 A1* | 7/2018 | Hart | ........................ B22F 10/28 |
| 2018/0326660 A1* | 11/2018 | Gifford | ................. B29C 64/241 |
| 2020/0324484 A1* | 10/2020 | Simpson | ............ G05B 19/4099 |
| 2021/0094234 A1* | 4/2021 | Patel | ....................... B29C 64/20 |

FOREIGN PATENT DOCUMENTS

| | | |
|---|---|---|
| DE | 02017131463 A1 | 4/2019 |
| TW | 201725072 A1 | 7/2017 |
| TW | M611752 U | 5/2021 |

* cited by examiner

*Primary Examiner* — Galen H Hauth
*Assistant Examiner* — Baileigh Kate Darnell
(74) *Attorney, Agent, or Firm* — Demian K. Jackson; Jackson IPG PLLC

(57) ABSTRACT

The present invention relates to an exchangeable additive manufacturing machine system. The system includes a manufacturing spindle; a thermal conducting module configured to include a working well in a center portion, wherein the manufacturing spindle is configured to rotate in the working well and the manufacturing spindle and the working well defines a manufacturing area; and an air curtain isolation mechanism module, configured to attach on a peripheral region in proximity to the thermal conducting module to actively generate an airflow across the working well and the manufacturing area to isolate the manufacturing area from an external environment.

9 Claims, 13 Drawing Sheets

EXCHANGEABLE ADDITIVE MANUFACTURING MACHINE SYSTEM WITH AIR CURTAIN ISOLATION MECHANISM

CROSS-REFERENCE TO RELATED APPLICATION

This application claims priority benefit to Taiwan Invention Patent Application Serial No. 111123517, filed on Jun. 23, 2022, in Taiwan Intellectual Property Office, the entire disclosures of which are incorporated by reference herein.

FIELD

The present invention relates to an exchangeable additive manufacturing machine system, in particular to an exchangeable additive manufacturing machine system having an air curtain isolation mechanism to implicitly close the manufacturing area.

BACKGROUND

In the state of the art of bioprinting technology, in order to incorporate with some special bioprinting materials have various different characteristics, it is used to perform a bioprinting operation in a relatively low temperature environment. For example, an operating temperature for a bioprinter machine is better to be controlled and maintained in a temperature in a range of from −20° C. to −40° C., which renders the deposited materials being capable of quickly and instantly solidifying to facilitate the successively multilayered stacking process for materials.

In practice, the entire bioprinting equipment is usually settled in a sterile room or a special work cell to operate, and the environmental conditions thereof is well controlled within a range subject to the required temperature and humidity conditions suitable for operating the equipment. Then the bioprinting process is subsequently executed under the controlled environment. However, this type of large-scale temperature control results in some apparent disadvantages, such as, leading to a relatively low efficiency for cooling or heating operation. Even though the external environment is controlled to meet the conditions, it yet has to spend quite a few time to do nothing but wait until the machine accommodated to reach the predetermined default values. Therefore, the preparation process may consume quite a long time.

Moreover, since the conventional art is used and required to control a wide range of external environmental conditions, no matter which process it performs including heating, cooling, or generating dry or humid air processes, it always depletes a lot of energy. Especially in the bioprinting process, since various types of bioprinting materials are used, the working temperature required for different bioprinting materials is different, which causes the situation to switch between positive and negative temperatures frequently, such as, switching between but not limited to, −40° C. and +37° C., during the bioprinting. Such a poor printing efficiency is obvious and needed to be improved as well.

Hence, there is a need to solve the above deficiencies/issues.

SUMMARY

The present invention relates to an exchangeable additive manufacturing machine system, in particular to an exchangeable additive manufacturing machine system having an air curtain isolation mechanism to implicitly close the manufacturing area.

The present provides a special designed air curtain isolation mechanism module, which is configured to attach on a semi-enclosed exchangeable additive manufacturing machine system, and generates a stable gas flow to implicitly seal the manufacturing area on the exchangeable additive manufacturing machine system. The exchangeable additive manufacturing machine system can be formed into different configurations by simply replacing the internal components to be switched between the different configurations of a semi-enclosed three-dimensional additive manufacturing machine and a rotary additive manufacturing machine.

The effect of the air curtain airflow can isolate the manufacturing area from the external environment to achieve energy saving effect, therefore the overall operating temperature range of the machine can be increased to at least −40° C. to +60° C., which is very suitable for the additive manufacturing of, such as but not limited to, biocompatible thermosensitive materials. The technology can effectively prevent energy loss. Only a small range of temperature control is required, and the temperature balance of the machine can be quickly reached. Therefore the manufacturing speed can be increased, and the manufacturing yield can also be improved. Additionally, by controlling the composition, temperature and humidity of the airflow, the stability of the manufacturing environment can be improved, the amount of frost formation can be reduced during low temperature manufacturing, and heat can be prevented from escaping during room temperature manufacturing.

Accordingly, the present invention provides an exchangeable additive manufacturing machine system, including: a thermal conducting module; a manufacturing platform and a plurality of flat additive manufacturing assembly components, wherein the plurality of flat additive manufacturing assembly components are selectively attached to a center portion of the thermal conducting module to form a working well, the manufacturing platform is selectively configured in the working well and moves along the working well and the manufacturing platform and the working well define a manufacturing area; a manufacturing spindle and a plurality of curve additive manufacturing assembly components, wherein the plurality of curve additive manufacturing assembly components are selectively attached to the center portion of the thermal conducting module to form the working well, the manufacturing spindle is selectively configured to rotate in the working well and the manufacturing spindle and the working well define the manufacturing area; and an air curtain isolation mechanism module, configured to attach on a peripheral region in proximity to the thermal conducting module to actively generate an airflow across the working well and the manufacturing area to isolate the manufacturing area from an external environment, wherein the exchangeable additive manufacturing machine system is formed as a three-dimensional additive manufacturing machine by selectively configuring with the manufacturing platform and the plurality of flat additive manufacturing assembly components or a rotary additive manufacturing machine by selectively configuring with the manufacturing spindle and the plurality of curve additive manufacturing assembly components.

Preferably, the air curtain isolation mechanism module further includes one of: an airflow generating unit abutting on the thermal conducting module; an airflow generating unit inlet and an airflow generating unit outlet; a cross flow fan drawing in an air from the airflow generating unit inlet to generate the airflow and draining out the airflow from the airflow generating unit outlet; a first electric machine driving the cross flow fan rotating to generate the airflow; and a first air deflector configured at the airflow generating unit outlet to guide the airflow; an airflow drawing unit abutting on the thermal conducting module and opposite to the airflow generating unit in position; an airflow drawing unit inlet and an airflow drawing unit outlet; an axial fan drawing in the airflow from the airflow drawing unit inlet and draining out the airflow from the airflow drawing unit outlet; a second electric machine driving the axial fan rotating to draw in the airflow; and a second air deflector configured at the airflow drawing unit inlet to guide the airflow; an airflow circulating pipe communicating the airflow drawing unit outlet and the airflow generating unit inlet to form an airflow circulating path; a humidity controller configured on the airflow circulating path; a temperature controller configured on the airflow circulating path; and an air filter configured on the airflow circulating path.

Preferably, the thermal conducting module further includes one of: a curve additive manufacturing positioning component; the plurality of curve additive manufacturing assembly components being attached to the thermal conducting module through guidance of the curve additive manufacturing positioning component, to configure in the center portion to form an inner wall of the working well, so to render the exchangeable additive manufacturing machine system to be formed as the rotary additive manufacturing machine; a flat additive manufacturing positioning component; and the plurality of flat additive manufacturing assembly components being attached to the thermal conducting module through guidance of the flat additive manufacturing positioning component, to configure in the center portion to form an inner wall of the working well, so to render the exchangeable additive manufacturing machine system to be formed as the three-dimensional additive manufacturing machine.

The present invention further provides an exchangeable additive manufacturing machine system, including: a manufacturing spindle; a thermal conducting module configured to include a working well in a center portion, wherein the manufacturing spindle is configured to rotate in the working well and the manufacturing spindle and the working well defines a manufacturing area; and an air curtain isolation mechanism module, configured to attach on a peripheral region in proximity to the thermal conducting module to actively generate an airflow across the working well and the manufacturing area to isolate the manufacturing area from an external environment.

Preferably, the thermal conducting module further includes one of: a curve additive manufacturing positioning component; and the plurality of curve additive manufacturing assembly components being attached to the thermal conducting module through guidance of the curve additive manufacturing positioning component, to configure in the center portion to form an inner wall of the working well, so to render the exchangeable additive manufacturing machine system to be formed as the rotary additive manufacturing machine.

The present invention further provides an exchangeable additive manufacturing machine system, including: a manufacturing platform; a thermal conducting module configured to include a working well in a center portion, wherein the manufacturing platform is configured in the working well and moves along the working well and the manufacturing platform and the working well define a manufacturing area; and an air curtain isolation mechanism module, configured to attach on a peripheral region in proximity to the thermal conducting module to actively generate an airflow across the working well and the manufacturing area to isolate the manufacturing area from an external environment.

Preferably, the thermal conducting module further includes one of: a flat additive manufacturing positioning component; and the plurality of flat additive manufacturing assembly components being attached to the thermal conducting module through guidance of the flat additive manufacturing positioning component, to configure in the center portion to form an inner wall of the working well, so to render the exchangeable additive manufacturing machine system to be formed as the three-dimensional additive manufacturing machine.

The above content described in the summary is intended to provide a simplified summary for the presently disclosed invention, so that readers are able to have an initial and basic understanding to the presently disclosed invention. The above content is not aimed to reveal or disclose a comprehensive and detailed description for the present invention, and is never intended to indicate essential elements in various embodiments in the present invention, or define the scope or coverage in the present invention.

DESCRIPTION OF THE DRAWINGS

A more complete appreciation of the invention and many of the attendant advantages thereof are readily obtained as the same become better understood by reference to the following detailed description when considered in connection with the accompanying drawing, wherein.

DETAILED DESCRIPTION

Figure 1:
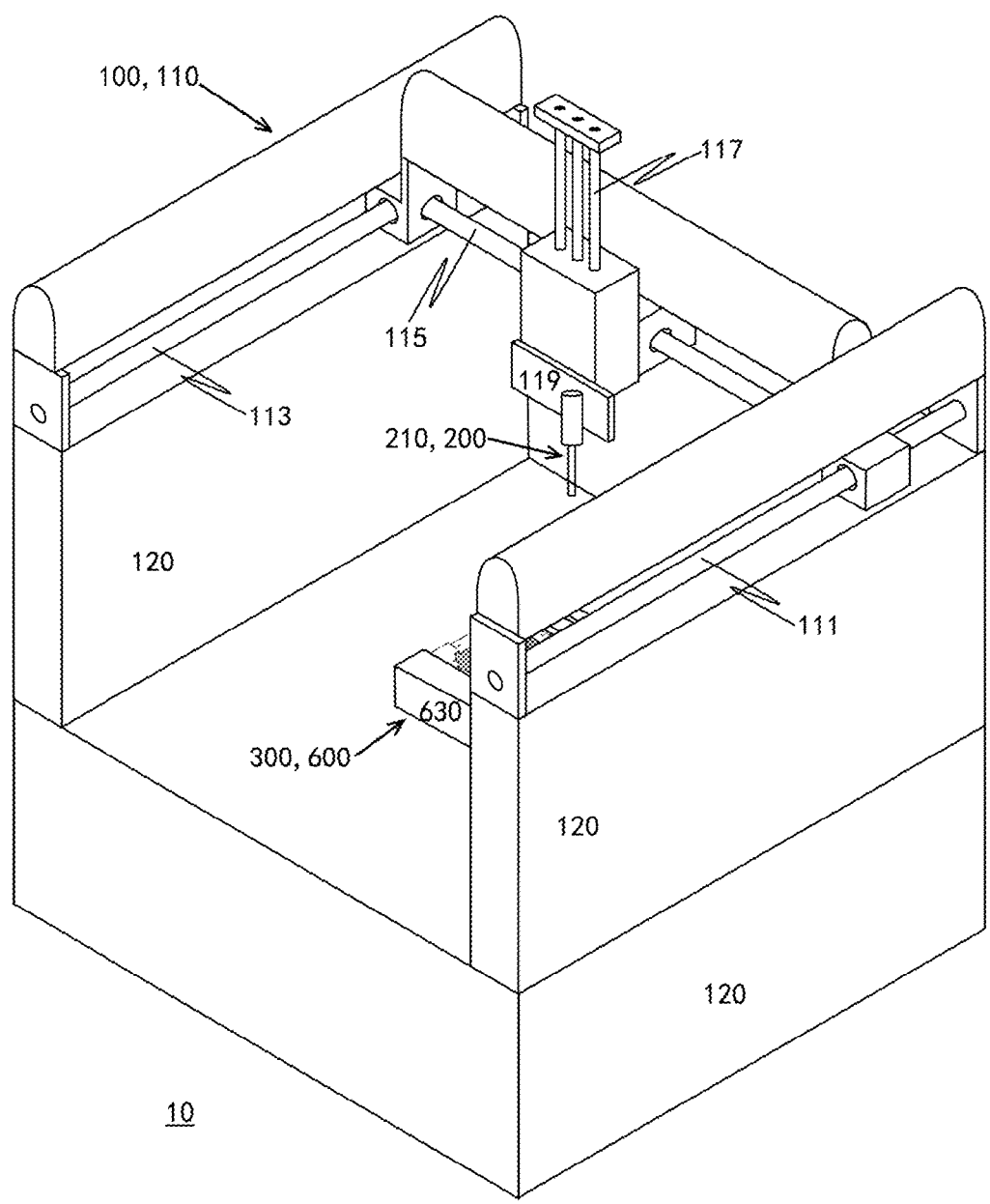
FIG. 1 is a schematic diagram illustrating an overall system for a three-dimensional additive manufacturing machine with an air curtain isolation mechanism in accordance with the present invention.

The present disclosure will be described with respect to particular embodiments and with reference to certain drawings, but the disclosure is not limited thereto but is only limited by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice.

It is to be noticed that the term "including," used in the claims, should not be interpreted as being restricted to the means listed thereafter; it does not exclude other elements or steps. It is thus to be interpreted as specifying the presence of the stated features, integers, steps or components as referred to, but does not preclude the presence or addition of one or more other features, integers, steps or components, or groups thereof. Thus, the scope of the expression "a device including means A and B" should not be limited to devices consisting only of components A and B.

The disclosure will now be described by a detailed description of several embodiments. It is clear that other embodiments can be configured according to the knowledge of persons skilled in the art without departing from the true technical teaching of the present disclosure, the claimed disclosure being limited only by the terms of the appended claims.

FIG. 1 to FIG. 5 are schematic diagrams illustrating a first embodiment for the exchangeable additive manufacturing machine system with an air curtain isolation mechanism in accordance with the present invention. FIG. 1 is a schematic diagram illustrating an overall system for a three-dimensional additive manufacturing machine with an air curtain isolation mechanism in accordance with the present invention. The exchangeable additive manufacturing machine system according to the present invention can be formed or configured as a semi-enclosed three-dimensional additive manufacturing machine of the first embodiment and the rotary additive manufacturing machine of the second embodiment by simply replacing the components. The three-dimensional additive manufacturing machine is preferably a three-dimensional bioprinter and is used to perform flat additive manufacturing operations based on the movement in three-dimensional rectangular coordinate system. The rotary additive manufacturing machine is preferably a rotary bioprinter and is used to perform curve additive manufacturing operations based on the movement in three-dimensional rectangular coordinate system combined with rotational motion.

In the first embodiment, as shown in FIG. 1, the exchangeable additive manufacturing machine system according to the present invention is preferably configured as a three-dimensional additive manufacturing machine 10, which includes a three-dimensional motion mechanism 100. The three-dimensional motion mechanism 100 is preferably a gantry multi-axis motion platform 110, which preferably includes two X-axis tracks 111 and 113 configured at a bottom 120, a Y-axis track 115, a Z-axis track 117 and a load carrier 119. Wherein the Y-axis track 115 is movably mounted on the X-axis tracks 111 and 113 and is driven by an X-axis linear motor (not shown) to move linearly along the X-axis tracks 111 and 113 to move toward an X-axis direction. The Z-axis track 117 is movably mounted on the Y-axis 115 and is driven by a Y-axis linear motor (not shown) to move linearly along the X-axis tracks 111 and 113 to move toward a Y-axis direction. The carrier 119 is movably mounted on the Z-axis track 117 and is driven by a Z-axis linear motor (not shown) to move linearly along the Z-axis track 117 to move toward a Z-axis direction. The carrier 119 provides the installation of a nozzle 210. After the nozzle 210 is installed on the carrier 119, it will perform three-axis movements in an X-axis direction, a Y-axis direction, and a Z-axis direction according to a pre-planned and set path.

In one embodiment, the maximum movement range of the gantry multi-axis motion platform 110 in the X-axis direction, the Y-axis direction, and the Z-axis direction is preferably 486×486×196 mm There are external optical scale feedback modules and horizontal correction modules configured on the X-axis tracks 111 and 113, the Y-axis track 115 and the Z-track 117. The overall positioning accuracy of the platform can reach ±1 μm.

The three-dimensional additive manufacturing machine 10 further includes an additive manufacturing module 200. The additive manufacturing module 200 includes a manufacturing material supply unit (not shown) and a nozzle 210. The manufacturing material supply module supplies manufacturing materials to the nozzle 210 through the material pipeline. The nozzle 210 is mounted on the gantry multi-axis motion platform 110 through the carrier 119 to perform three-axis movements in an X-axis direction, a Y-axis direction, and a Z-axis direction. The nozzle 210 is preferably, for example, but not limited to, an extrusion nozzle or an inkjet nozzle, and is used to output a manufacturing material for three-dimensional additive manufacturing. The manufacturing material is preferably, for example, but not limited to, biodegradable polyurethane (Bio-PU) materials.

The three-dimensional additive manufacturing machine 10 further includes a thermal conducting module 300 arranged below the motion range of the gantry multi-axis motion platform 110, an air curtain isolation mechanism module 600, and an airflow drawing unit 630 arranged above the thermal conducting module 300.

Figure 2A:
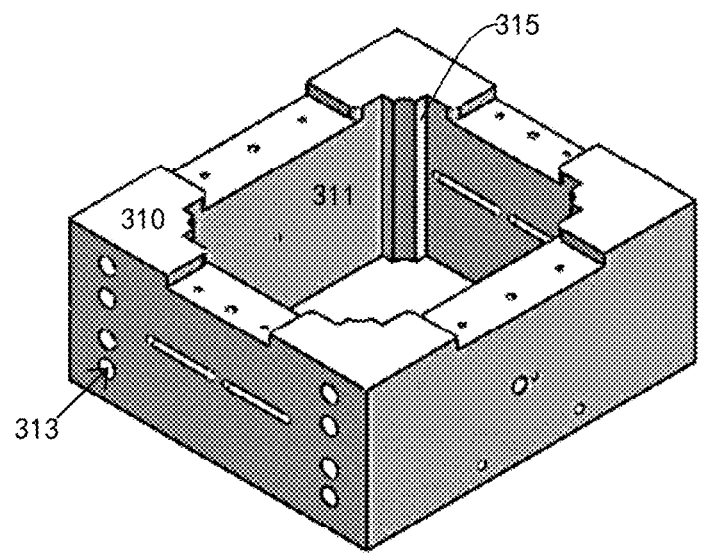
FIG. 2(a) is a schematic diagram illustrating a structure for a thermal conducting base included in the first embodiment of the thermal conducting module included in the three-dimensional additive manufacturing machine with the air curtain isolation mechanism in accordance with the present invention.
Figure 2B:
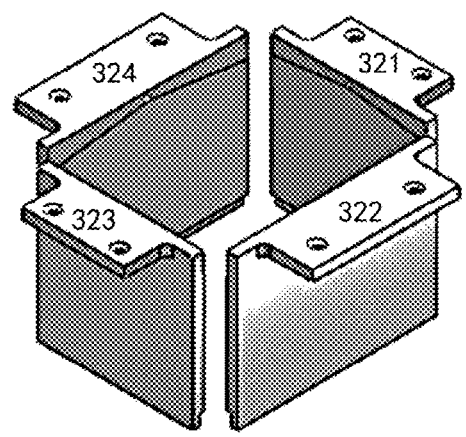
FIG. 2(b) is a schematic diagram illustrating a structure for a flat additive manufacturing assembly components included in the first embodiment of the thermal conducting module included in the three-dimensional additive manufacturing machine with the air curtain isolation mechanism in accordance with the present invention.
Figure 2C:
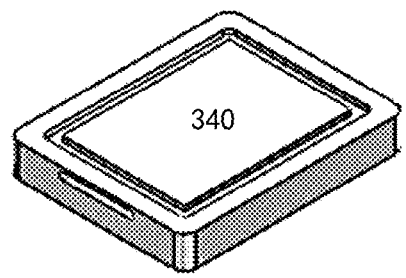
FIG. 2(c) is a schematic diagram illustrating a structure for a lifting manufacturing platform included in the first embodiment of the thermal conducting module included in the three-dimensional additive manufacturing machine with the air curtain isolation mechanism in accordance with the present invention.
Figure 3:
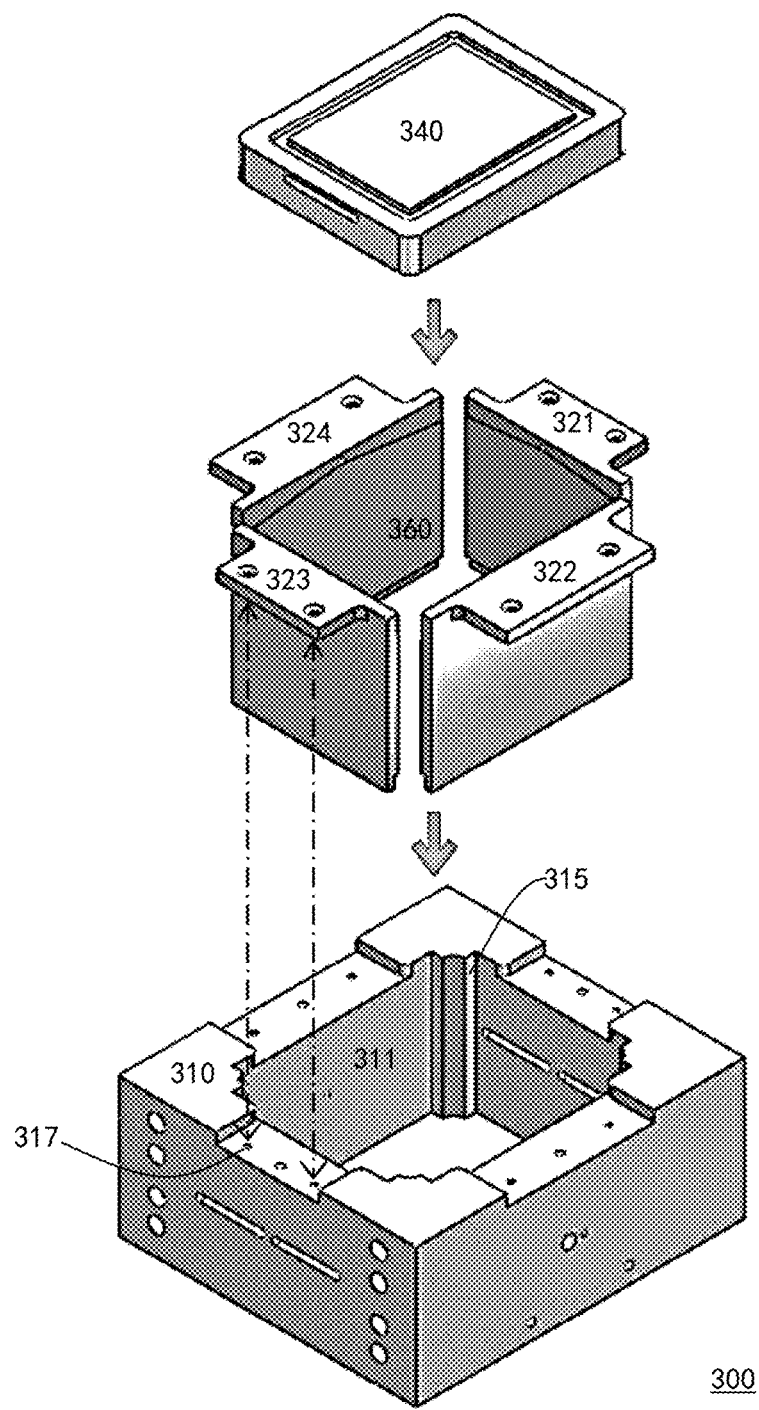
FIG. 3 is a schematic diagram illustrating a structural assembly for the first embodiment of the thermal conducting module in accordance with the present invention.
Figure 4A:
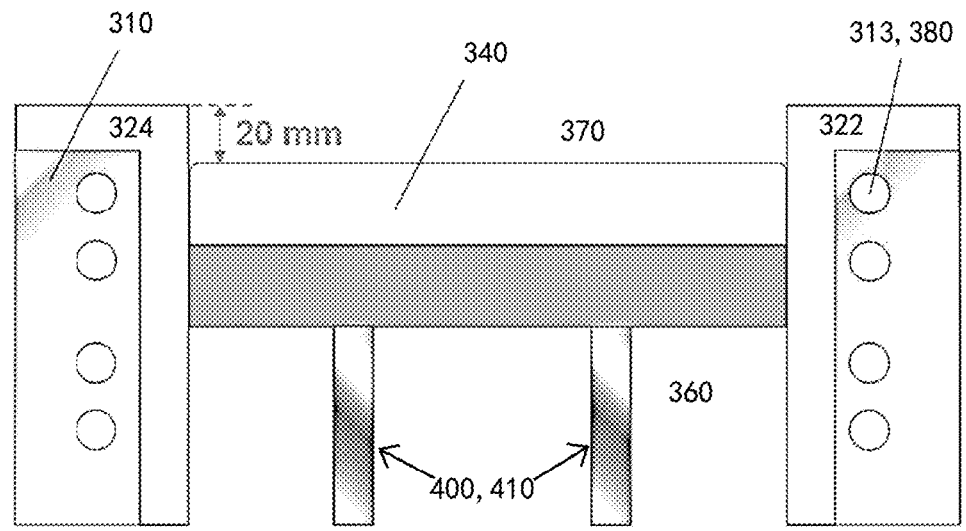
FIG. 4(a) is a cross-sectional side view schematic diagram illustrating an overall structure for the first embodiment of the thermal conducting module in accordance with the present invention.
Figure 4B:
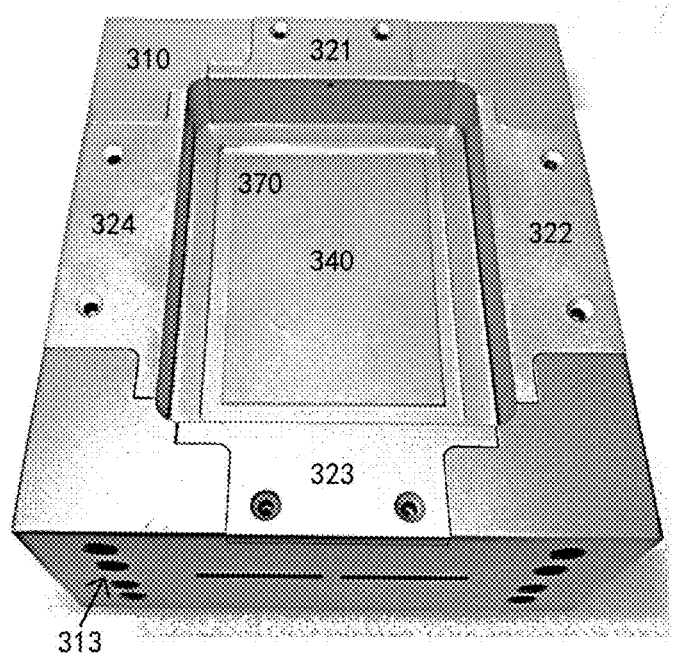
FIG. 4(b) is a schematic diagram illustrating an overall structure for the first embodiment of the thermal conducting module in accordance with the present invention.

FIG. 2(a) is a schematic diagram illustrating a structure for a thermal conducting base included in the first embodiment of the thermal conducting module included in the three-dimensional additive manufacturing machine with the air curtain isolation mechanism in accordance with the present invention. FIG. 2(b) is a schematic diagram illustrating a structure for a flat additive manufacturing assembly components included in the first embodiment of the thermal conducting module included in the three-dimensional additive manufacturing machine with the air curtain isolation mechanism in accordance with the present invention. FIG. 2(c) is a schematic diagram illustrating a structure for a lifting manufacturing platform included in the first embodiment of the thermal conducting module included in the three-dimensional additive manufacturing machine with the air curtain isolation mechanism in accordance with the present invention. FIG. 3 is a schematic diagram illustrating a structural assembly for the first embodiment of the thermal conducting module in accordance with the present invention. FIG. 4(a) is a cross-sectional side view schematic diagram illustrating an overall structure for the first embodiment of the thermal conducting module in accordance with the present invention. FIG. 4(b) is a schematic diagram illustrating an overall structure for the first embodiment of the thermal conducting module in accordance with the present invention.

The three-dimensional additive manufacturing machine 10 further includes a thermal conducting module 300. The thermal conducting module 300 includes a thermal conducting base 310, a plurality of flat additive manufacturing assembly components 321, 322, 323 and 324, and a lifting manufacturing platform 340, etc. The geometric structure of the thermal conducting base 310 is preferably a frame-shaped structure, and a rectangular channel 311 is formed in the center of the frame-shaped structure, and a plurality of medium channels 313 are included in the structure to provide the heat transfer medium 380 to flow therein. A series of positioning components configured on the inner surface of the rectangular channel 311 includes a plurality of positioning grooves 315 and assembly holes 317, therefore flat additive manufacturing assembly components 321, 322, 323 and 324 can combine to the thermal conducting base 310 according to the positioning grooves 315 and the assembly holes 317.

Furthermore, the geometric structure of the thermal conducting base 310 is preferably a geometric shape, such as, but not limited to, rectangle, circle, ellipse, etc. The material of the thermal conducting base 310 is preferably stainless steel, which is corrosion-resistant and easy to be sterilized.

The plurality of flat additive manufacturing assembly components 321, 322, 323 and 324 are mainly installed on the inner surface of the rectangular channel 311 of the thermal conducting base 310 to form a working well 360. The four flat additive manufacturing assembly components 321, 322, 323 and 324 can provide flat surfaces for the four inner walls of the working well 360, therefore the manufacturing platform 340 can be embedded in the working well 360 and moved along the working well 360, e.g., raised or lowered, to change the position and height of the manufacturing platform 340 in the Z-axis direction. The working well 360 and the manufacturing platform 340 will jointly define a depth-height variable manufacturing area 370.

The three-dimensional additive manufacturing machine 10 according to the present invention further includes a manufacturing platform controlling module 400. The manufacturing platform controlling module 400 includes a linear motor (not shown) and one or more drive shaft 410, wherein the drive shaft 410 is arranged below the manufacturing platform 340. The linear motor drives the manufacturing platform 340 to move along the working well 360 through the drive shaft 410.

In the three-dimensional additive manufacturing machine 10 according to the present invention, the additive manufacturing will be performed in the manufacturing area 370 above the lifting manufacturing platform 340. The nozzle 210 is controlled by the gantry multi-axis motion platform 110, and is positioned within the range of the manufacturing area 370 for additive manufacturing. The manufacturing platform 340 can be moved up and down along the working well 360 in the Z-axis direction, therefore in the process of manufacturing the same layer of deposition structure or the entire additive manufacturing process, the height of the nozzle 210 in the Z-axis direction can be fixed, and the nozzle 210 can be moved in the X-axis and Y-axis directions on the XY plane only. In addition, by changing the height of the manufacturing platform 340 in the Z-axis direction, the effect of layer-by-layer additive manufacturing is achieved.

The three-dimensional additive manufacturing machine 10 also includes a temperature circulated controlling module, which includes a circulated cooling unit and a circulated heating unit. The circulated cooling unit is preferably, for example, but not limited to, a refrigerated circulator, which actively cools the heat transfer medium 380 to a preset temperature, and then the cooled heat transfer medium 380 is pumped to the medium channel 313 inside the thermal conducting base 310 through a circulating pipe. Then the heat transfer medium 380 is recovered through the circulating pipe and re-cooled, and the cycle is repeated continuously, thereby the thermal conducting base 310 is cooled to the preset operating temperature. The circulated heating unit is preferably, for example, but not limited to, a heating circulator, which actively heats the heat transfer medium 380 to a preset temperature, and then the heated heat transfer medium 380 is pumped to the medium channel 313 inside the thermal conducting base 310 through a circulating pipe. Then the heat transfer medium 380 is recovered through the circulating pipe and re-heated, and the cycle is repeated continuously, thereby the thermal conducting base 310 is heated to the preset operating temperature. The heat transfer medium 380 is preferably a coolant or a circulating fluid. In this embodiment, the coolant is preferably 99.5% ethanol (ECOH).

Figure 5A:
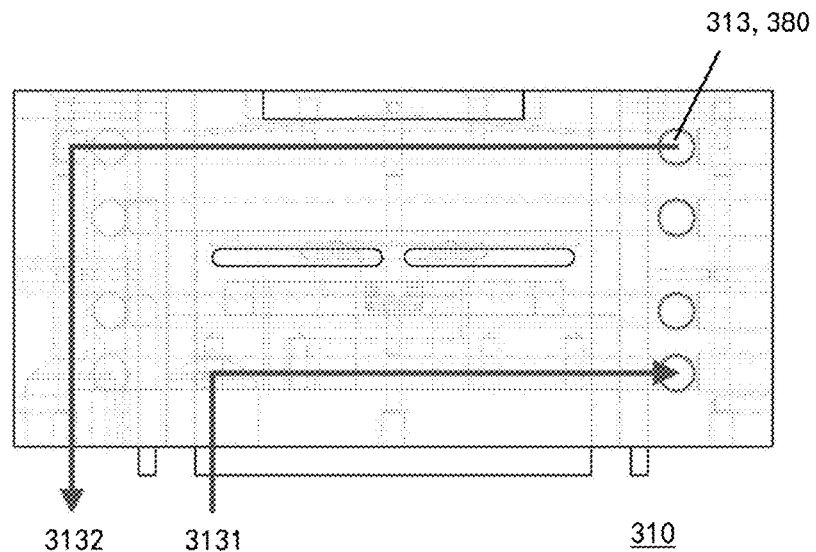
FIG. 5(a) is a cross-sectional side view schematic diagram illustrating a structural arrangement for the medium channel inside the thermal conducting base in accordance with the present invention.
Figure 5B:
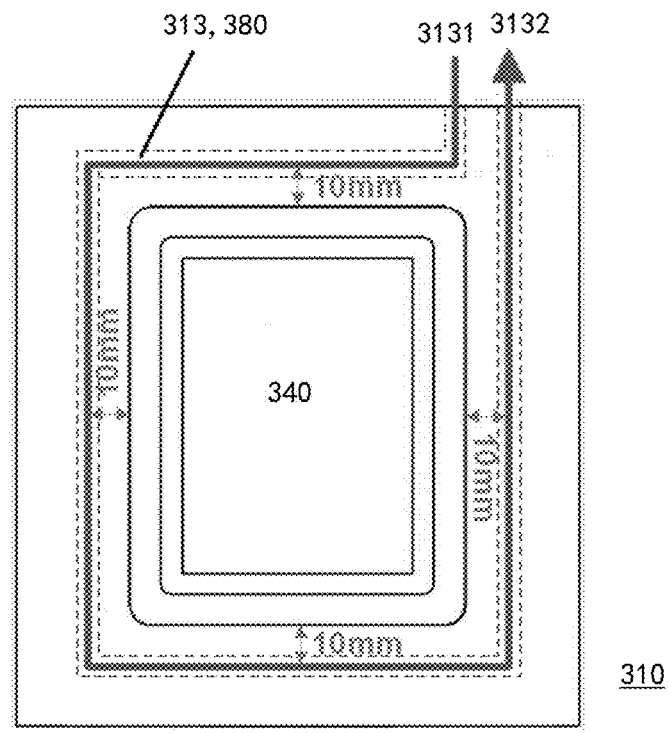
FIG. 5(b) is a top-view schematic diagram illustrating a structural arrangement for the medium channel inside the thermal conducting base in accordance with the present invention.

FIG. 5(a) is a cross-sectional side view schematic diagram illustrating a structural arrangement for the medium channel inside the thermal conducting base according to the present invention. FIG. 5(b) is a top-view schematic diagram illustrating a structural arrangement for the medium channel inside the thermal conducting base in accordance with the present invention. In the internal structure configuration of the thermal conducting base 310, the medium channel 313 is configured to a multi-layer configuration, wherein each layer of the medium channels 313 is arranged in a circle at a certain height. It helps to make the temperature distribution of the manufacturing platform 340 more consistent during the lifting and lowering process of the working well 360. An inlet 3131 of the medium channel 313 is arranged at the lower layer of the thermal conducting base 310, and an outlet 3132 is arranged at the upper layer of the thermal conducting base 310. When the manufacturing process is turn into the manufacturing of the higher layer structure, such as, but not limited to, the manufacturing of the higher-layer bioscaffold structure, the manufacturing platform 340 can be closer to the inlet 3131 after the height is going down. The heat transfer medium 380 near the inlet 3131 will be in a cooler or hotter status due to less energy dissipation, accordingly the heat transfer efficiency is improved.

During the additive manufacturing process, the heat transfer medium 380 is supplied by the temperature circulated controlling module. The heated or cooled heat transfer medium 380 is pumped by the temperature circulated controlling module and transported to the inlet 3131 of the medium channel 313, then entered the medium channel 313, and circulated inside the thermal conducting base 310 to cool or heat the thermal conducting base 310. The energy will be transmitted through the thermal conducting base 310 to the flat additive manufacturing assembly components 321, 322, 323 and 324 around the working well 360, and then transported to the central manufacturing platform 340 thorough contact conduction. Therefore, the manufacturing platform 340 is cooled or heated, and the energy is transferred to the deposited manufacturing materials on the manufacturing platform 340.

Figure 6:
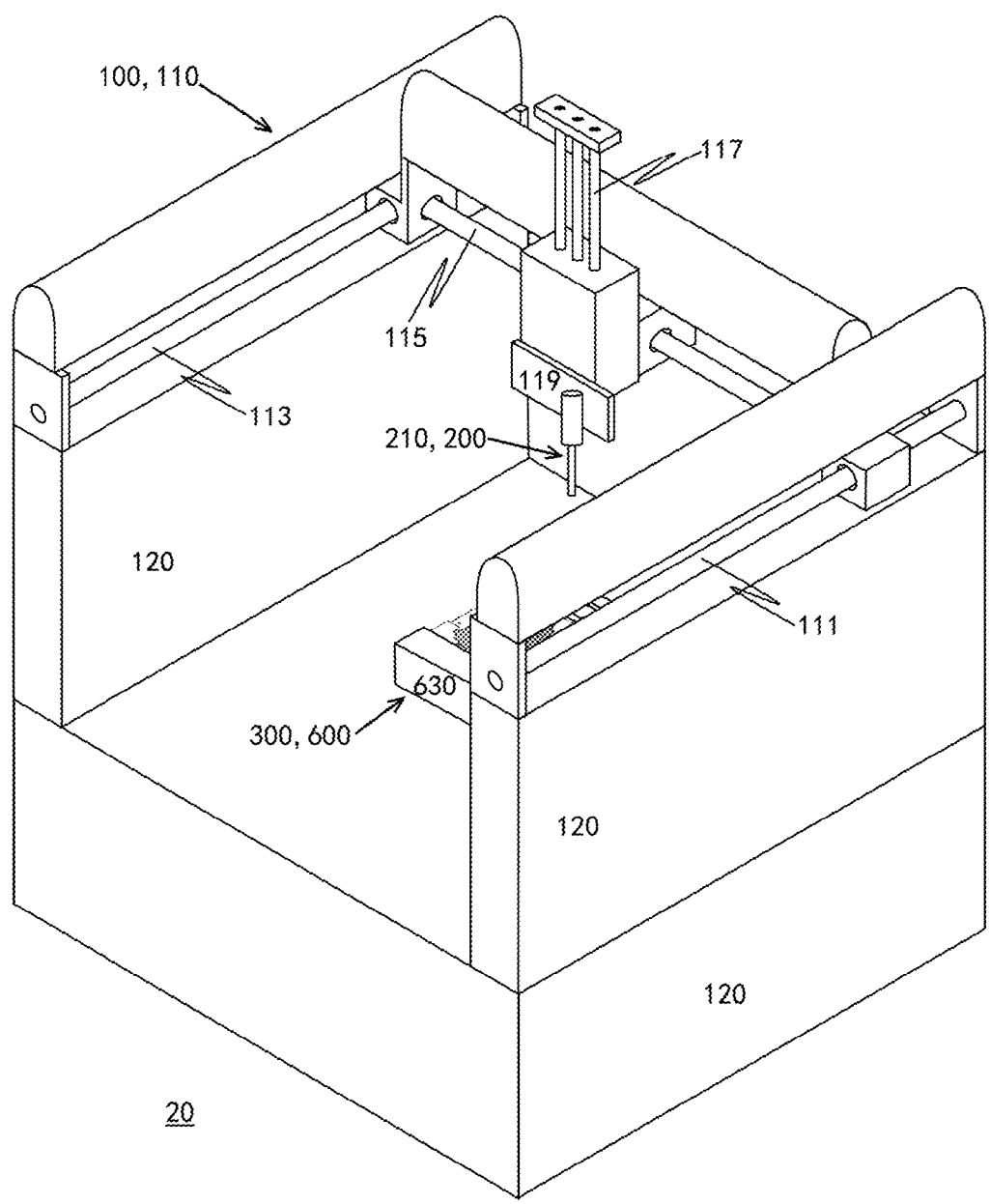
FIG. 6 is a schematic diagram illustrating a rotary additive manufacturing machine with an air curtain isolation mechanism in accordance with the present invention.

FIG. 6 to FIG. 10 are schematic diagrams illustrating a second embodiment of an exchangeable additive manufacturing machine system with an air curtain isolation mechanism in accordance with the present invention. FIG. 6 is a schematic diagram illustrating a rotary additive manufacturing machine with an air curtain isolation mechanism in accordance with the present invention. In the second embodiment, the exchangeable additive manufacturing machine system according to the present invention is preferably configured as a rotary additive manufacturing machine 20, which includes the first embodiment and at least the three-dimensional motion mechanism 100 disclosed in the first embodiment, an additive manufacturing module 200, a thermal conducting module 300, a temperature circulated controlling module, an air curtain isolation mechanism module 600 and an airflow drawing unit 630, etc.

Figure 7A:
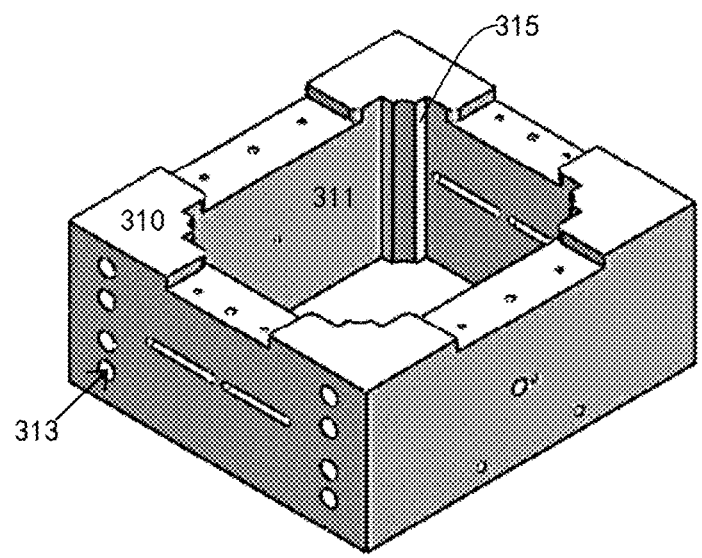
FIG. 7(a) is a schematic diagram illustrating a structure for a thermal conducting base included in the second embodiment of a thermal conducting module in accordance with the present invention.
Figure 7B:
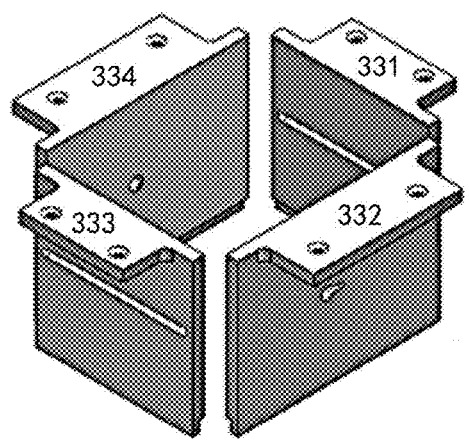
FIG. 7(b) is a schematic diagram illustrating a structure for a curve additive manufacturing assembly component included in the second embodiment of the thermal conducting module in accordance with the present invention.
Figure 7C:
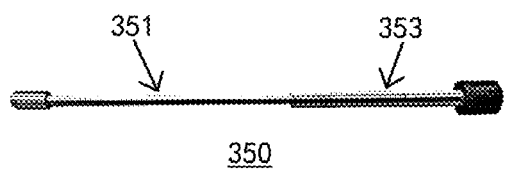
FIG. 7(c) is a schematic diagram illustrating a structure for a manufacturing spindle included in the second embodiment of the thermal conducting module in accordance with the present invention.
Figure 8:
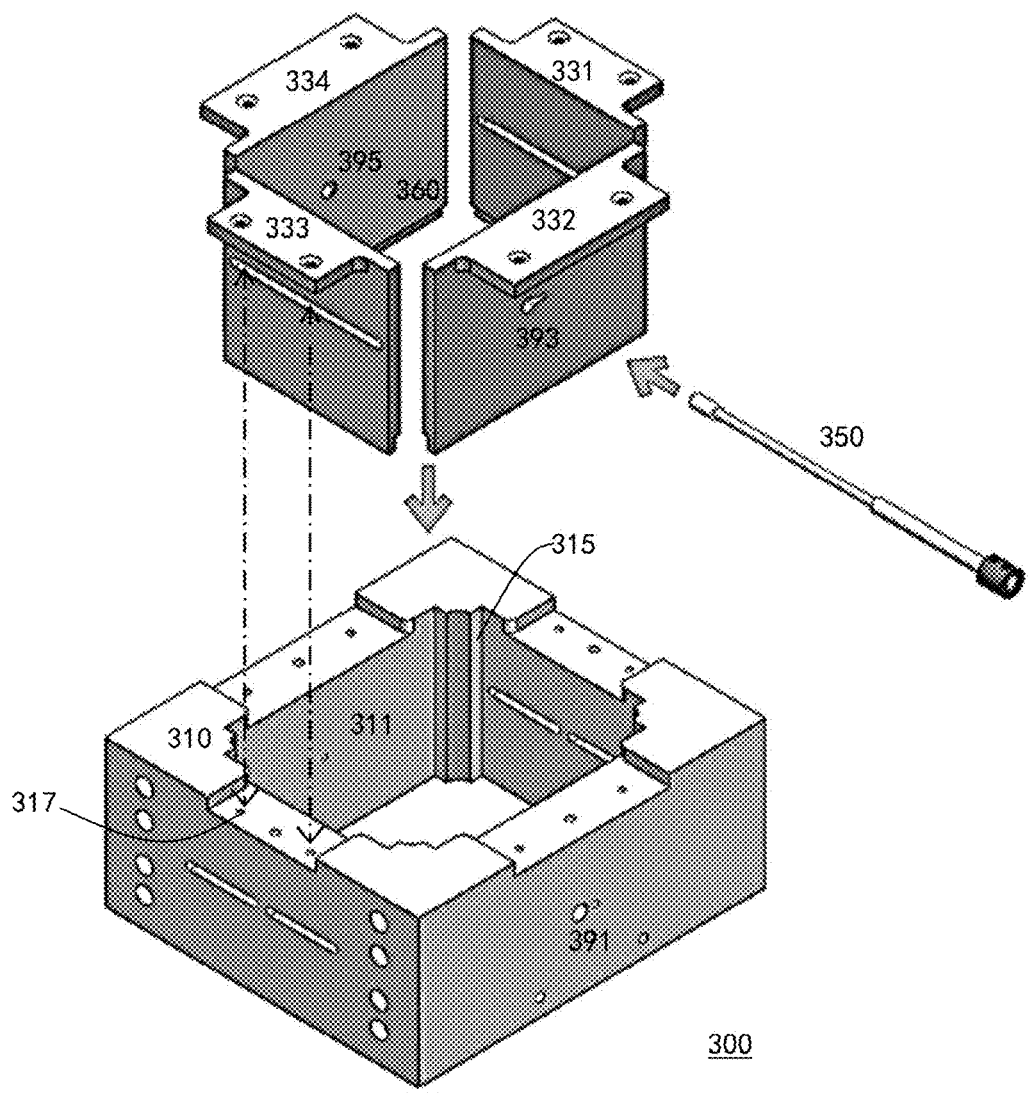
FIG. 8 is a schematic diagram illustrating a structural assembly for the second embodiment of the thermal conducting module in accordance with the present invention.
Figure 9A:
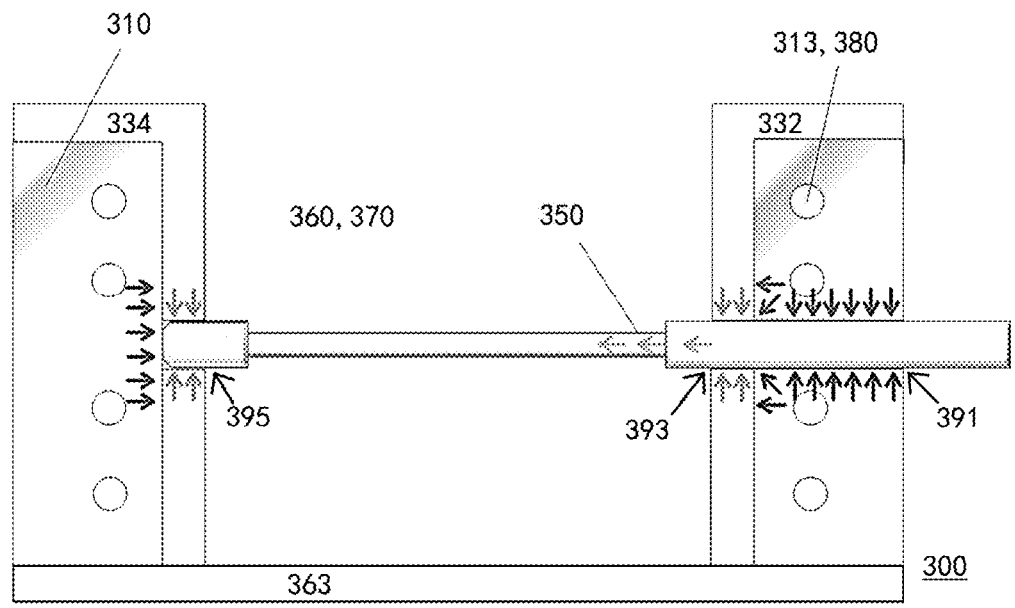
FIG. 9(a) is a cross-sectional side view schematic diagram illustrating an overall structure for the second embodiment of the thermal conducting module in accordance with the present invention.
Figure 9B:
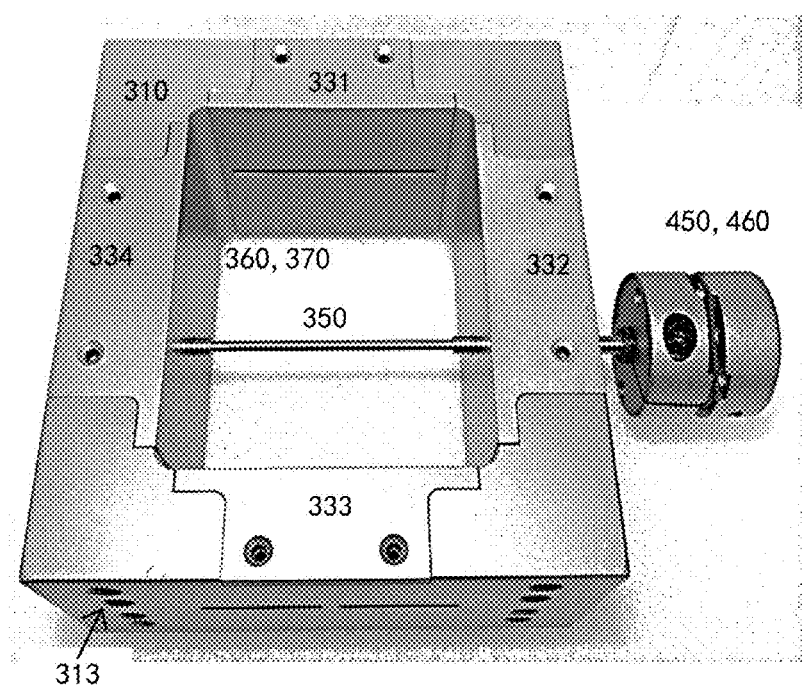
FIG. 9(b) is a schematic diagram illustrating an overall structure for the second embodiment of the thermal conducting module in accordance with the present invention.

FIG. 7(a) is a schematic diagram illustrating a structure for a thermal conducting base included in the second embodiment of a thermal conducting module in accordance with the present invention. FIG. 7(b) is a schematic diagram illustrating a structure for a curve additive manufacturing assembly component included in the second embodiment of the thermal conducting module in accordance with the present invention. FIG. 7(c) is a schematic diagram illustrating a structure for a manufacturing spindle included in the second embodiment of the thermal conducting module in accordance with the present invention. FIG. 8 is a schematic diagram illustrating a structural assembly for the second embodiment of the thermal conducting module in accordance with the present invention. FIG. 9(a) is a cross-sectional side view schematic diagram illustrating an overall structure for the second embodiment of the thermal conducting module in accordance with the present invention. FIG. 9(b) is a schematic diagram illustrating an overall structure for the second embodiment of the thermal conducting module in accordance with the present invention.

The rotary additive manufacturing machine 20 further includes the thermal conducting module 300 disclosed in the first embodiment. The thermal conducting module 300 includes a thermal conducting base 310, a plurality of curve additive manufacturing assembly components 331, 332, 333 and 334, and a manufacturing spindle 350, etc. The interior of the thermal conducting base 310 includes a medium channel 313 for providing the heat transfer medium 380 to flow therein. The thermal conducting base 310 includes a plurality of positioning grooves 315 and assembly holes 317, therefore curve additive manufacturing assembly components 321, 322, 323 and 324 can combine to the thermal conducting base 310 according to the positioning grooves 315 and the assembly holes 317, and then a working well 360 is formed.

In order to make assembly and disassembly easier, the assembly system of the manufacturing spindle 350 utilizes a single-side insertion method. The manufacturing spindle 350 sequentially passes through a first bearing bore 391 opened on the thermal conducting base 310, a second bearing bore 393 on the corresponding curve additive manufacturing assembly component 332, and is inserted into a third bearing bore 395 on the opposite curve additive manufacturing assembly component 334. The manufacturing spindle 350 inserted into the third bearing bore 395 will not contact the thermal conducting base 310 behind the curve additive manufacturing assembly component 333 to reduce friction during rotation. The energy is transferred to the manufacturing spindle 350 through the first bearing bore 391, the second bearing bore 393 and the third bearing bore 395, which contact with the manufacturing spindle 350. A bottom plate 363 is further included under the thermal conducting base 310 to seal the bottom of the working well 360, thus the manufacturing area 370 is formed as a five-sided enclosed space.

The rotary additive manufacturing machine 20 according to the present invention further includes a rotary motion controlling module 450. The rotary motion controlling module 450 includes a step motor 460. The manufacturing spindle 350 is preferably driven by the step motor 460 of the rotary motion controlling module 450.

In the rotary additive manufacturing machine 20 according to the present invention, the additive manufacturing is performed in the manufacturing area 370 above the manufacturing spindle 350. The additive manufacturing is performed by the nozzle 210 within the range of the manufacturing area 370. The rotary additive manufacturing machine 20 is mainly used for the production of, for example, but not limited to, three-dimensional tubular structures.

Figure 10:
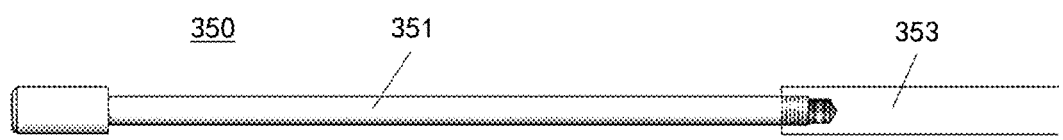
FIG. 10 is a cross-sectional side view schematic diagram illustrating a two-stage structure for a manufacturing spindle included in the second embodiment of the thermal conducting module in accordance with the present invention.

FIG. 10 is a cross-sectional side view schematic diagram illustrating a two-stage structure for a manufacturing spindle included in the second embodiment of the thermal conducting module in accordance with the present invention. Since the additive manufacturing is performed on the manufacturing spindle 350, after the additive manufacturing is completed, the finished product is attached to the manufacturing spindle 350. As a result, the manufacturing spindle 350 cannot be directly pull away from the first bearing bore 391, the second bearing bore 393 and the third bearing bore 395.

Therefore, in the rotary additive manufacturing machine 20 according to the present invention, the manufacturing spindle 350 is designed as a two-stage structure. The manufacturing spindle 350 includes a connecting section 351 and a manufacturing section 353 through screwing. Therefore, in the manufacturing spindle 350 according to the present invention, after the curve additive manufacturing layer is completed, the manufacturing section 353 can be directly removed from the interior of the working well 360 to avoid damage to the finished product.

The exchangeable additive manufacturing machine system according to the present invention includes at least the three-dimensional additive manufacturing machine 10 of the first embodiment and the rotary additive manufacturing machine 20 of the second embodiment. The design concept is to limit the temperature control range of the additive manufacturing process to only the five-sided enclosed space or semi-enclosed space, i.e., the manufacturing area 370, formed by the four inner walls of the working well 360 and the manufacturing platform 340 or the manufacturing spindle 350, thereby the temperature control range of the additive manufacturing process is greatly reduced, and the heat conducting efficiency is effectively improved. Thus, the overall performance and energy consumption of the machine has significantly improved.

However, above the manufacturing area 370, the nozzle 210 is need still to be opened for the machine to obtain a significant improvement in overall performance and energy consumption, therefore the nozzle 210 can enter the manufacturing area 370 to perform additive manufacturing. As a result, the manufacturing area 370 is not completely isolated from the surrounding environment, and the energy inside the manufacturing area 370 is continuously flow out to the external environment during the manufacturing process. In addition, the manufacturing area 370 is also easily affected by moisture and aqueous vapor in the external environment, which causes frost on the inner wall of the working well 360 and the manufacturing platform 340 or the manufacturing spindle 350 after the cooling of the machine. It hinders the process of the additive manufacturing, and the stability of the overall manufacturing environment of the machine is still insufficient.

Figure 11:
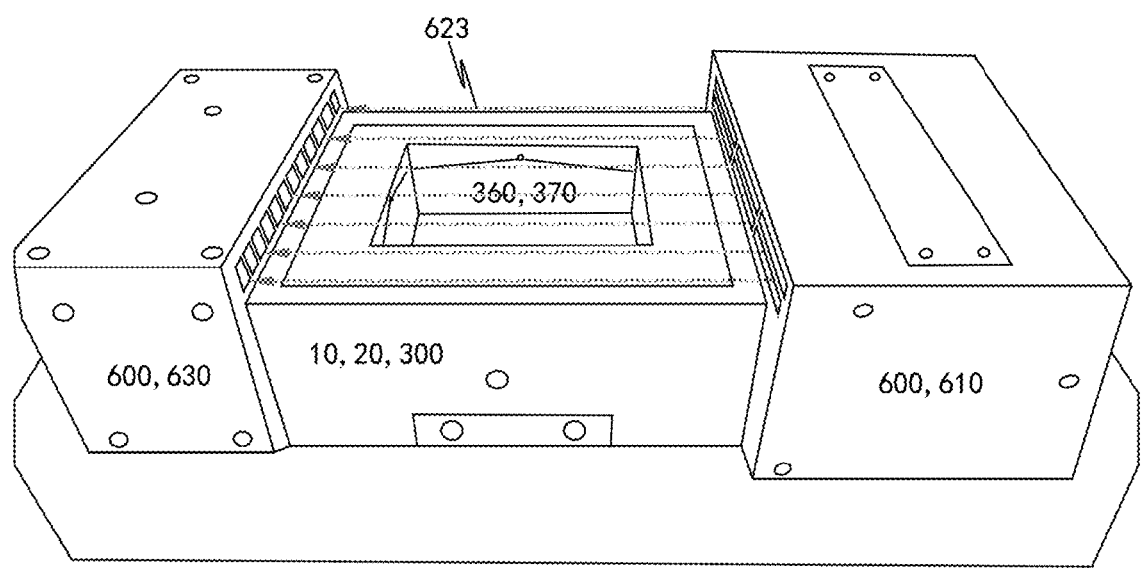
FIG. 11 is a schematic diagram illustrating a structure for an air curtain isolation mechanism module arranged on an exchangeable additive manufacturing machine system in accordance with the present invention.

FIG. 11 is a schematic diagram illustrating a structure for an air curtain isolation mechanism module arranged on an exchangeable additive manufacturing machine system in accordance with the present invention. The air curtain isolation mechanism module 600 in the present invention is arranged in the peripheral area of the two sides of the thermal conducting base 310 of the thermal conducting module 300 of the additive manufacturing machine system, which includes the three-dimensional additive manufacturing machine 10 and the rotary additive manufacturing machine 20. The air curtain isolation mechanism module 600 is able to generate a smooth gas jet across the working well 360 and the manufacturing area 370 above the manufacturing area 370 to seal the manufacturing area 370 implicitly. The stability of the manufacturing environment is improved by controlling the composition, temperature and humidity of the airflow 623. It reduces the amount of frost or energy loss during low temperature manufacturing, and prevents heat energy from escaping during room temperature manufacturing or higher temperature manufacturing.

Figure 12:
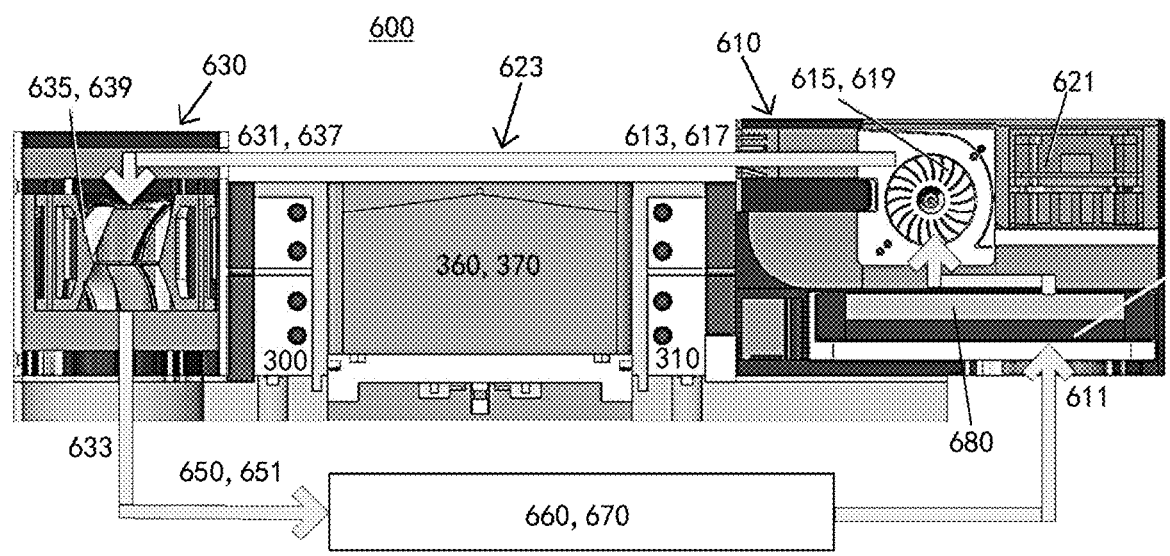
FIG. 12 is a schematic diagram illustrating a module for an air curtain isolation mechanism included in an exchangeable additive manufacturing machine system in accordance with the present invention.

FIG. 12 is a schematic diagram illustrating a module for an air curtain isolation mechanism included in an exchangeable additive manufacturing machine system in accordance with the present invention. The active elements of the air curtain isolation mechanism module 600 include an active airflow generating unit 610 and an active airflow drawing unit 630, etc. The active airflow generating unit 610 further includes an airflow generating unit inlet 611 and an airflow generating unit outlet 613, and is configured with an ultra-high-volume cross flow fan 615, a first air deflector 617 arranged on the path of the airflow 623 generated by the airflow generating unit outlet 613 and the ultra-high-volume cross flow fan 615, a first electric machine 619 corresponding to drive the ultra-high-volume cross flow fan 615, and an electric machine controller 621.

The active airflow drawing unit 630 further includes an airflow drawing unit inlet 631 and an airflow drawing unit outlet 633, and is configured with an ultra-high-volume axial flow fan 635, a second air deflector 637 arranged at the airflow drawing unit inlet 631, and a second electric machine 639 corresponding to drive the ultra-high-volume axial flow fan 635. The active airflow drawing unit 630 is preferably configured with two ultra-high-volume axial flow fans 635 and two electric machine to improve the recovering efficiency of the airflow 623.

The active airflow generating unit 610 and the active airflow drawing unit 630 are disposed on opposite sides and are arranged relative to each other. The ultra-high-volume cross flow fan 615 of the active airflow generating unit 610 blows out the air smoothly to form an airflow 623.

A negative pressure area in front of the active airflow drawing unit 630 is formed by the two ultra-high-volume axial fans 635 of the active airflow drawing unit 630, the airflow 623 is inhaled, and the airflow is guided to concentrate on the top of the manufacturing area 370 to avoid spreading. Therefore, an air circulation system is formed, and an air curtain is generated to implicitly seal above the manufacturing area 370.

Taking the low-temperature additive manufacturing as an example, in a low-temperature working environment, if the moisture contained in the air is frozen into a contact gap, the transmission of cooling capacity may be reduced, it may also cause the manufacturing platform or the manufacturing spindle to be frozen and then affect the operation of the machine. The airflow 623 generated by the air curtain isolation mechanism module 600 in the present invention is able to effectively block the contact between the manufacturing area 370 and the external environment.

The air curtain isolation mechanism module 600 further includes an airflow circulating pipe 650 to connect the airflow drawing unit outlet 633 with the airflow generating unit inlet 611, and then an air circulating path 651 is formed.

In order to reduce the influence of the generated air curtain airflow 623 on the manufacturing area 370, in addition to properly controlling the rotational speed of the ultra-high-volume cross flow fan 615 and the ultra-high-volume axial fan 635 through the electric machine controller 621, according to the present invention, a humidity controller 660, such as a chemical dryer, and a temperature controller 670 are further configured at appropriate positions on the airflow circulating path 651 to adjust the humidity and temperature of the airflow. For example, when the manufacturing material is a hydrogel, an air curtain airflow with a relative humidity (RH) of about 60 can be generated through the humidity controller 660 to prevent the hydrogel from drying out during the manufacturing process. When low temperature manufacturing is required, dry air can be introduced through the humidity controller 660 to reduce the amount of frost, and the temperature controller 670 can be used to reduce the airflow temperature to effectively improve the quality of the manufacturing environment.

Furthermore, in order to prevent the blown air from contaminating additive manufacturing products, an air filter 680 can be optionally arranged on the airflow circulating path 651 inside the active airflow generating unit 610. The air filter 680 is preferably a multi-layer filter, a macromolecular filter layer, an activate charcoal filter layer, a HEPA H13 medical grade filter layer or a PP electrostatic layer, etc., to ensure the air quality of the air curtain airflow.

Figure 13:
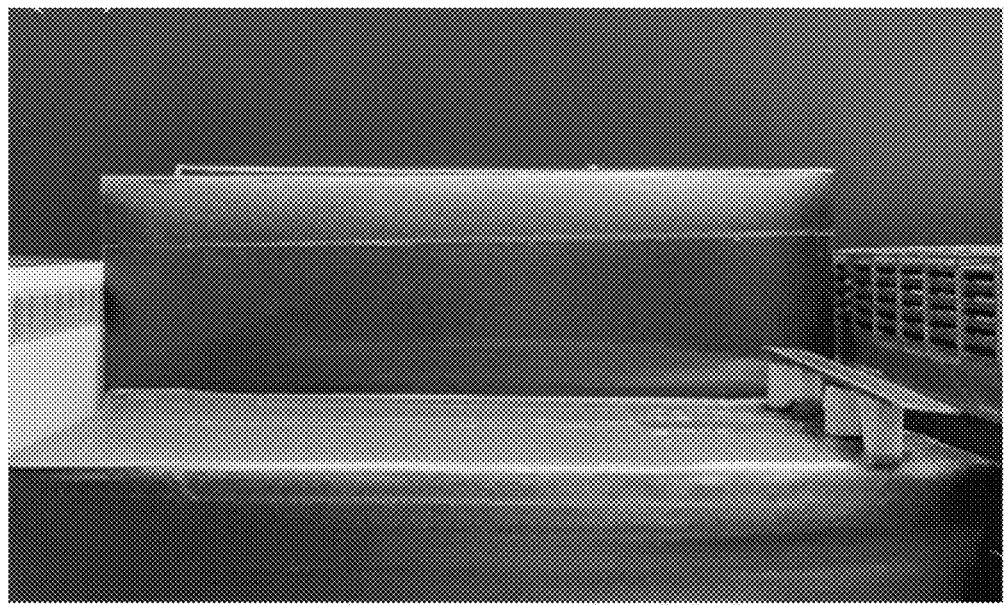
FIG. 13 is a photograph showing a flow field streamline of an air curtain airflow generated by an air curtain isolation mechanism module in accordance with the present invention.

FIG. 13 is a photograph showing a flow field streamline of an air curtain airflow generated by an air curtain isolation mechanism module in accordance with the present invention. After the air curtain airflow generated by the air curtain isolation mechanism module 600 according to the present invention reaches a steady and stable state, the streamline formed by the smoke lines after the visualization of the flow field is as shown in FIG. 13. As shown in FIG. 13, the air curtain airflow that reaches a constant and steady state shows smooth characteristics.

Figure 14A:
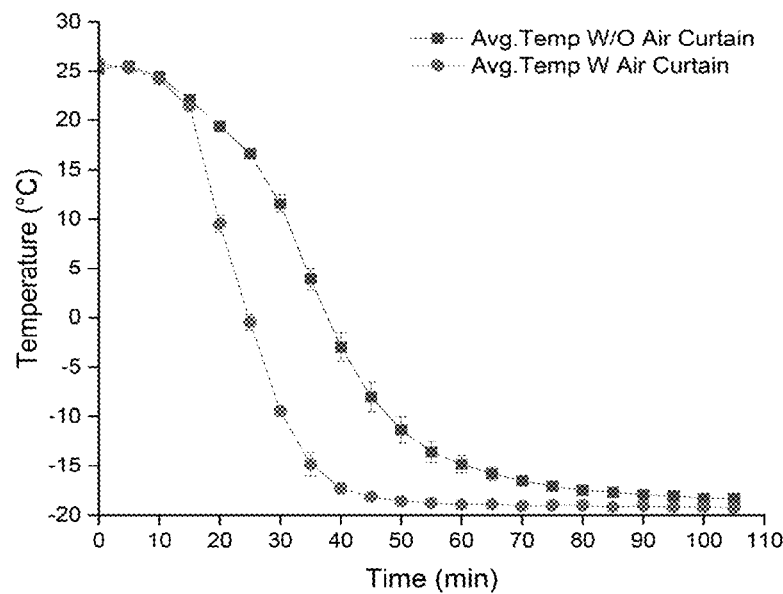
FIG. 14(a) is a curve chart illustrating the relationship between the average temperature and the time in a manufacturing area of a three-dimensional additive manufacturing machine with and without an air curtain isolation mechanism module.
Figure 14B:
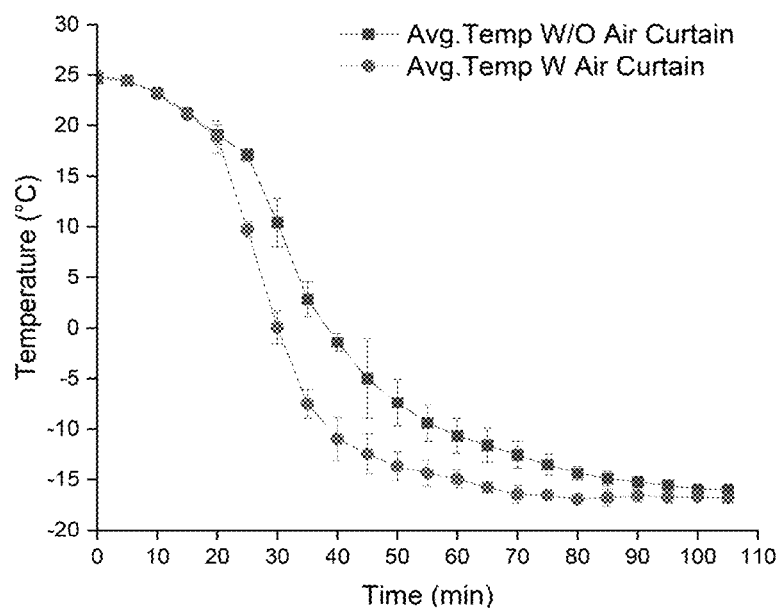
FIG. 14(b) is a curve chart illustrating the relationship between the average temperature and the time in a manufacturing area of a rotary additive manufacturing machine with and without an air curtain isolation mechanism module.

FIG. 14(a) is a curve chart illustrating the relationship between the average temperature and the time in a manufacturing area of a three-dimensional additive manufacturing machine with and without an air curtain isolation mechanism module. FIG. 14(b) is a curve chart illustrating the relationship between the average temperature and the time in a manufacturing area of a rotary additive manufacturing machine with and without an air curtain isolation mechanism module. Taking low-temperature additive manufacturing as an example, as shown in FIG. 14(a) and FIG. 14(b), the average temperature in the production region of either a three-dimensional additive manufacturing machine or a rotary additive manufacturing machine drops earlier after the air curtain isolation mechanism module is used. Compared with the non-air curtain isolation mechanism, the stable operating temperature is reached about 30 minutes earlier, which effectively improves the experimental efficiency. The air curtain isolation mechanism module effectively reduces the temperature of the manufacturing area.

Furthermore, whether a three-dimensional additive manufacturing machine or a rotary additive manufacturing machine, when the air curtain isolation mechanism module is used, the final operating temperature of the manufacturing area is reduced at least 1° C. compared to the case without the air curtain isolation mechanism. It is proved that the stability of the manufacturing environment is increased due to the obstruction of the airflow of the air curtain, therefore the low-temperature energy can be effectively stored in the manufacturing area. The effect of the humidity controller and the temperature controller is significant.

The effect of the air curtain can isolate the manufacturing area from the external environment to achieve the energy saving effect, and consequently the range of the operating temperature of the machine will be increased to at least −40° C. to +60° C., which is very suitable for operating, such as but not limited to, additive manufacturing of biocompatible temperature sensitive materials, and it can effectively prevent energy loss. Because only a small range of temperature control is required, the machine can quickly reach the temperature balance, the manufacturing speed is increased, and the production yield is also improved. By controlling the airflow composition, temperature and humidity, the stability of the manufacturing environment is improved. It reduces the amount of frost or energy loss during low temperature manufacturing, and prevents heat energy from escaping during room temperature manufacturing or higher temperature manufacturing.

The arrangement of the air curtain isolation mechanism module 600 according to the present invention does not hinder the movement of the printing nozzle 210 and the gantry multi-axis motion platform 110. The nozzle 210 is still allowed to freely perform additive manufacturing operations while the manufacturing area 370 is implicitly enclosed.

The exchangeable additive manufacturing machine system according to the present invention can be formed into different configurations by simply replacing flat additive manufacturing assembly components 321, 322, 323 and 324, and curve additive manufacturing assembly components 331, 332, 333 and 334 on the thermal conducting base 310 to be switched between the different configurations of the three-dimensional additive manufacturing machine 10 and the rotary additive manufacturing machine 20, without changing the three-dimensional motion mechanism 100, the additive manufacturing module 200 and the air curtain isolation mechanism module 600.

The exchangeable additive manufacturing machine system with air curtain isolation mechanism in accordance with the present invention further includes at least the following features: (1) the layer-by-layer additive manufacturing is performed by the manufacturing platform that is lifted and lowered in the Z-axis direction to reduce the movement of the gantry multi-axis motion platform in the Z-axis direction; (2) it is switched between the three-dimensional additive manufacturing machine and the rotary additive manufacturing machine by simply replacing different assembly components, without changing most main components; and (3) it is equipped with an air curtain isolation mechanism module to generate a smooth airflow above the manufacturing area to covertly enclose the manufacturing area, and greatly reduce the amount of frost or energy loss.

There are further embodiments provided as follows.

Embodiment 1: An exchangeable additive manufacturing machine system, including: a thermal conducting module; a manufacturing platform and a plurality of flat additive manufacturing assembly components, wherein the plurality of flat additive manufacturing assembly components are selectively attached to a center portion of the thermal conducting module to form a working well, the manufacturing platform is selectively configured in the working well and moves along the working well and the manufacturing platform and the working well define a manufacturing area; a manufacturing spindle and a plurality of curve additive manufacturing assembly components, wherein the plurality of curve additive manufacturing assembly components are selectively attached to the center portion of the thermal conducting module to form the working well, the manufacturing spindle is selectively configured to rotate in the working well and the manufacturing spindle and the working well define the manufacturing area; and an air curtain isolation mechanism module, configured to attach on a peripheral region in proximity to the thermal conducting module to actively generate an airflow across the working well and the manufacturing area to isolate the manufacturing area from an external environment, wherein the exchangeable additive manufacturing machine system is formed as a three-dimensional additive manufacturing machine by selectively configuring with the manufacturing platform and the plurality of flat additive manufacturing assembly components or a rotary additive manufacturing machine by selectively configuring with the manufacturing spindle and the plurality of curve additive manufacturing assembly components.

Embodiment 2: The exchangeable additive manufacturing machine system as described in Embodiment 1, further including one of: the thermal conducting module further including a medium channel inside providing for a heat transfer medium flowing therein, wherein the medium channel has an entrance configured at a bottom side of the thermal conducting module; a three-dimensional motion mechanism including a gantry multi-axis motion platform to carry a nozzle and drive the nozzle to move along an X-axis track, a Y-axis track and a Z-axis track to move toward an X-axis direction, a Y-axis direction and a Z-axis direction respectively; the nozzle being positioned on the manufacturing area by the three-dimensional motion mechanism; a circulated cooling unit configured to actively cool down the heat transfer medium; a circulated heating unit configured to actively heat up the heat transfer medium; a circulating pipe communicating between the circulated cooling unit and the thermal conducting module or communicating between the circulated heating unit and the thermal conducting module, and providing for the heat transfer medium flowing therein; a manufacturing platform controlling module including a linear motor to drive the manufacturing platform moving along the working well; and a spindle controlling module including a step motor to drive the manufacturing spindle to rotate.

Embodiment 3: The exchangeable additive manufacturing machine system as described in Embodiment 2, wherein the air curtain isolation mechanism module further includes one of: an airflow generating unit abutting on the thermal conducting module; an airflow generating unit inlet and an airflow generating unit outlet; a cross flow fan drawing in an air from the airflow generating unit inlet to generate the airflow and draining out the airflow from the airflow generating unit outlet; a first electric machine driving the cross flow fan rotating to generate the airflow; and a first air deflector configured at the airflow generating unit outlet to guide the airflow; an airflow drawing unit abutting on the thermal conducting module and opposite to the airflow generating unit in position; an airflow drawing unit inlet and an airflow drawing unit outlet; an axial fan drawing in the airflow from the airflow drawing unit inlet and draining out the airflow from the airflow drawing unit outlet; a second electric machine driving the axial fan rotating to draw in the airflow; and a second air deflector configured at the airflow drawing unit inlet to guide the airflow; an airflow circulating pipe communicating the airflow drawing unit outlet and the airflow generating unit inlet to form an airflow circulating path; a humidity controller configured on the airflow circulating path; a temperature controller configured on the airflow circulating path; and an air filter configured on the airflow circulating path.

Embodiment 4: The exchangeable additive manufacturing machine system as described in Embodiment 1, wherein the thermal conducting module further includes one of: a curve additive manufacturing positioning component; the plurality of curve additive manufacturing assembly components being attached to the thermal conducting module through guidance of the curve additive manufacturing positioning component, to configure in the center portion to form an inner wall of the working well, so to render the exchangeable additive manufacturing machine system to be formed as the rotary additive manufacturing machine; a flat additive manufacturing positioning component; and the plurality of flat additive manufacturing assembly components being attached to the thermal conducting module through guidance of the flat additive manufacturing positioning component, to configure in the center portion to form an inner wall of the working well, so to render the exchangeable additive manufacturing machine system to be formed as the three-dimensional additive manufacturing machine.

Embodiment 5: The exchangeable additive manufacturing machine system as described in Embodiment 2, wherein the heat transfer medium is a coolant liquid, a circulating fluid or an Ethanol.

Embodiment 6: An exchangeable additive manufacturing machine system, including: a manufacturing spindle; a thermal conducting module configured to include a working well in a center portion, wherein the manufacturing spindle is configured to rotate in the working well and the manufacturing spindle and the working well defines a manufacturing area; and an air curtain isolation mechanism module, configured to attach on a peripheral region in proximity to the thermal conducting module to actively generate an airflow across the working well and the manufacturing area to isolate the manufacturing area from an external environment.

Embodiment 7: The exchangeable additive manufacturing machine system as described in Embodiment 6, wherein the thermal conducting module further includes one of: a curve additive manufacturing positioning component; and the plurality of curve additive manufacturing assembly components being attached to the thermal conducting module through guidance of the curve additive manufacturing positioning component, to configure in the center portion to form an inner wall of the working well, so to render the exchangeable additive manufacturing machine system to be formed as the rotary additive manufacturing machine.

Embodiment 8: An exchangeable additive manufacturing machine system, including a manufacturing platform; a thermal conducting module configured to include a working well in a center portion, wherein the manufacturing platform is configured in the working well and moves along the working well and the manufacturing platform and the working well define a manufacturing area; and an air curtain isolation mechanism module, configured to attach on a peripheral region in proximity to the thermal conducting module to actively generate an airflow across the working well and the manufacturing area to isolate the manufacturing area from an external environment.

Embodiment 9: The exchangeable additive manufacturing machine system as described in Embodiment 8, wherein the thermal conducting module further includes one of: a flat additive manufacturing positioning component; and the plurality of flat additive manufacturing assembly components being attached to the thermal conducting module through guidance of the flat additive manufacturing positioning component, to configure in the center portion to form an inner wall of the working well, so to render the exchangeable additive manufacturing machine system to be formed as the three-dimensional additive manufacturing machine.

While the disclosure has been described in terms of what are presently considered to be the most practical and preferred embodiments, it is to be understood that the disclosure need not be limited to the disclosed embodiments. On the contrary, it is intended to cover various modifications and similar arrangements included within the spirit and scope of the appended claims, which are to be accorded with the broadest interpretation so as to encompass all such modifications and similar structures. Therefore, the above description and illustration should not be taken as limiting the scope of the present disclosure which is defined by the appended claims.

What is claimed is:

1. An exchangeable additive manufacturing machine system, comprising:
   a thermal conducting module;
   a manufacturing platform and a plurality of flat additive manufacturing assembly components, wherein the plurality of flat additive manufacturing assembly components are selectively attached to a center portion of the thermal conducting module to form a working well, the manufacturing platform is selectively configured in the working well and moves along the working well and the manufacturing platform and the working well define a manufacturing area;
   a manufacturing spindle and a plurality of curve additive manufacturing assembly components, wherein the plurality of curve additive manufacturing assembly components are selectively attached to the center portion of the thermal conducting module to form the working well, the manufacturing spindle is selectively configured to rotate in the working well and the manufacturing spindle and the working well define the manufacturing area; and
   an air curtain isolation mechanism module, configured to attach on a peripheral region in proximity to the thermal conducting module to actively generate an airflow across the working well and the manufacturing area to isolate the manufacturing area from an external environment,
   wherein the exchangeable additive manufacturing machine system is formed as a three-dimensional additive manufacturing machine by selectively configuring with the manufacturing platform and the plurality of flat additive manufacturing assembly components or a rotary additive manufacturing machine by selectively configuring with the manufacturing spindle and the plurality of curve additive manufacturing assembly components.

2. The exchangeable additive manufacturing machine system as claimed in claim 1, further comprising one of:
   the thermal conducting module further comprising a medium channel inside providing for a heat transfer medium flowing therein, wherein the medium channel has an entrance configured at a bottom side of the thermal conducting module;
   a three-dimensional motion mechanism comprising a gantry multi-axis motion platform to carry a nozzle and drive the nozzle to move along an X-axis track, a Y-axis track and a Z-axis track to move toward an X-axis direction, a Y-axis direction and a Z-axis direction respectively;
   the nozzle being positioned on the manufacturing area by the three-dimensional motion mechanism;
   a circulated cooling unit configured to actively cool down the heat transfer medium;
   a circulated heating unit configured to actively heat up the heat transfer medium;
   a circulating pipe communicating between the circulated cooling unit and the thermal conducting module or communicating between the circulated heating unit and the thermal conducting module, and providing for the heat transfer medium flowing therein;
   a manufacturing platform controlling module comprising a linear motor to drive the manufacturing platform moving along the working well; and
   a spindle controlling module comprising a step motor to drive the manufacturing spindle to rotate.

3. The exchangeable additive manufacturing machine system as claimed in claim 2, wherein the air curtain isolation mechanism module further comprises one of:
   an airflow generating unit abutting on the thermal conducting module;
   an airflow generating unit inlet and an airflow generating unit outlet;
   a cross flow fan drawing in an air from the airflow generating unit inlet to generate the airflow and draining out the airflow from the airflow generating unit outlet;
   a first electric machine driving the cross flow fan rotating to generate the airflow; and
   a first air deflector configured at the airflow generating unit outlet to guide the airflow;
   an airflow drawing unit abutting on the thermal conducting module and opposite to the airflow generating unit in position;
   an airflow drawing unit inlet and an airflow drawing unit outlet;
   an axial fan drawing in the airflow from the airflow drawing unit inlet and draining out the airflow from the airflow drawing unit outlet;
   a second electric machine driving the axial fan rotating to draw in the airflow; and
   a second air deflector configured at the airflow drawing unit inlet to guide the airflow;
   an airflow circulating pipe communicating the airflow drawing unit outlet and the airflow generating unit inlet to form an airflow circulating path;
   a humidity controller configured on the airflow circulating path;
   a temperature controller configured on the airflow circulating path; and
   an air filter configured on the airflow circulating path.

4. The exchangeable additive manufacturing machine system as claimed in claim 2, wherein the heat transfer medium is a coolant liquid, a circulating fluid or an Ethanol.

5. The exchangeable additive manufacturing machine system as claimed in claim 1, wherein the thermal conducting module further comprises one of:
   a curve additive manufacturing positioning component;
   the plurality of curve additive manufacturing assembly components being attached to the thermal conducting module through guidance of the curve additive manufacturing positioning component, to configure in the center portion to form an inner wall of the working well, so to render the exchangeable additive manufacturing machine system to be formed as the rotary additive manufacturing machine;
   a flat additive manufacturing positioning component; and
   the plurality of flat additive manufacturing assembly components being attached to the thermal conducting module through guidance of the flat additive manufacturing positioning component, to configure in the center portion to form an inner wall of the working well, so to render the exchangeable additive manufacturing machine system to be formed as the three-dimensional additive manufacturing machine.

6. An exchangeable additive manufacturing machine system, comprising:
   a manufacturing spindle;
   a thermal conducting module configured to include a working well in a center portion, wherein the manufacturing spindle is configured to rotate in the working well and the manufacturing spindle and the working well defines a manufacturing area; and an air curtain isolation mechanism module, configured to attach on a peripheral region in proximity to the thermal conducting module to actively generate an airflow across the working well and the manufacturing area to isolate the manufacturing area from an external environment.

7. The exchangeable additive manufacturing machine system as claimed in claim 6, wherein the thermal conducting module further comprises one of:

a curve additive manufacturing positioning component; and the plurality of curve additive manufacturing assembly components being attached to the thermal conducting module through guidance of the curve additive manufacturing positioning component, to configure in the center portion to form an inner wall of the working well, so to render the exchangeable additive manufacturing machine system to be formed as the rotary additive manufacturing machine.

8. An exchangeable additive manufacturing machine system, comprising:

a manufacturing platform;

a thermal conducting module configured to include a working well in a center portion, wherein the manufacturing platform is configured in the working well and moves along the working well and the manufacturing platform and the working well define a manufacturing area; and an air curtain isolation mechanism module, configured to attach on a peripheral region in proximity to the thermal conducting module to actively generate an airflow across the working well and the manufacturing area to isolate the manufacturing area from an external environment.

9. The exchangeable additive manufacturing machine system as claimed in claim 8, wherein the thermal conducting module further comprises one of:

a flat additive manufacturing positioning component; and the plurality of flat additive manufacturing assembly components being attached to the thermal conducting module through guidance of the flat additive manufacturing positioning component, to configure in the center portion to form an inner wall of the working well, so to render the exchangeable additive manufacturing machine system to be formed as the three-dimensional additive manufacturing machine.

* * * * *